United States Patent [19]

Hoffman et al.

[11] Patent Number: 4,646,889

[45] Date of Patent: Mar. 3, 1987

[54] COMPRESSOR DRIVE WITH OIL DISTRIBUTION SLEEVE

[75] Inventors: Fred W. Hoffman, Brunswick; Richard J. Reitz, Amherst, both of Ohio

[73] Assignee: Allied Corporation, Morristown, N.J.

[21] Appl. No.: 773,169

[22] Filed: Sep. 6, 1985

[51] Int. Cl.[4] .............................................. F16D 13/72
[52] U.S. Cl. .............................. 192/70.12; 192/113 B; 138/40
[58] Field of Search ......................... 192/113 B, 70.12; 138/40, 42, 44

[56] References Cited

U.S. PATENT DOCUMENTS

| | | | |
|---|---|---|---|
| 2,958,399 | 11/1960 | Osborne | 192/113 B X |
| 2,968,372 | 1/1961 | Kern | 192/113 B X |
| 3,202,018 | 8/1965 | Hilpert | 192/113 B X |
| 3,385,412 | 5/1968 | Isgren, Jr. | 192/113 B |
| 3,422,943 | 1/1969 | Zeidler | 192/113 B |
| 3,613,848 | 10/1971 | Reiff | 192/113 B X |
| 3,789,880 | 2/1974 | Armstrong | 138/42 X |
| 4,266,576 | 5/1981 | Bradford | 138/40 |
| 4,573,561 | 3/1986 | Deem et al. | 192/91 A |

Primary Examiner—Carl D. Friedman
Attorney, Agent, or Firm—Ken C. Decker; William N. Antonis

[57] ABSTRACT

A compressor drive controls the driving connection between a vehicle engine and an air compressor. The drive includes a clutch disc pack which is lubricated by lubricating fluid communicated through a passage on the spindle upon which the disc pack is mounted. A sleeve mounted in the passage provides a flow-restricting orifice which controls communication into an annular chamber defined between the sleeve and the passage. Axial-spaced apertures permit fluid communication from the annular chamber to each pair of plates in the disc pack.

10 Claims, 3 Drawing Figures

COMPRESSOR DRIVE WITH OIL DISTRIBUTION SLEEVE

This invention relates to a compressor drive which controls the driving connection between a vehicle engine and an air compressor, and, more particularly, relates to an oil distribution control mechanism for such a compressor drive.

Large commercial vehicles have been equipped with brakes actuated by compressed air for many years. The compressed air used to operate the braking system of these vehicles is supplied by a vehicle air compressor which is driven by the vehicle engine. Since commercial vehicles often travel long periods of time without requiring a brake actuation, operation of the air compressor is not necessary for significant periods of time. Accordingly, it is desirable to equip such vehicles with a compressor drive that disconnects the air compressor from the driving connection with the vehicle engine when compressed air is not needed. Such a drive is disclosed in copending U.S. patent application Ser. No. 507,263 filed June 23, 1983. The drive disclosed in this application includes clutch plates which are immersed in an oil bath and which are driven into and out of driving engagement with one another in order to couple and uncouple the air compressor from its driving connection with the engine. The present invention relates to an improvement of the device disclosed in the above-identified application, and provides a mechanism for controlling flow of lubricating oil to the clutch plates so that the clutch plates are properly lubricated without consuming so much lubricating fluid that the air compressor itself is starved for lubricating fluid.

Other features of the invention will become apparent with reference to the following description and drawings, in which.

Figure 1:
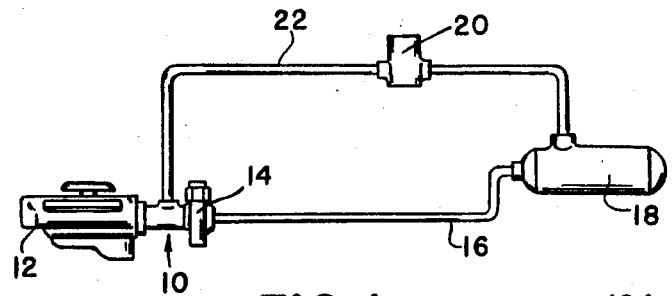
FIG. 1 is a schematic illustration of a compressor, vehicle engine, drive mechanism, unloading device, and a reservoir showing the connections therebetween.

Referring now to the drawing, an air actuated clutch drive mechanism generally indicated by the numeral 10 provides a driving connection between a vehicle engine 12 and a vehicle air compressor illustrated schematically at 14. The output of the compressor 14 is communicated via air line 16 to charge a reservoir 18. A conventional unloading mechanism 20 is responsive to the pressure level in the reservoir 18. The unloading mechanism 20 communicates a pressure signal through a pressure line 22 to the port 24 of the drive mechanism 10 when the pressure level in the reservoir 18 attains a predetermined level.

The drive clutch mechanism 10 includes a housing 26 which defines a bore 28 therewithin which communicates with the inlet port 24. The end of the bore 28 is defined by a web 30 through which an aperture 32 extends. The aperture 32 supports a bearing 34 which in turn supports an outlet drive spindle 36. The output drive spindle 36 is a projecting stub portion of a crankshaft 35 of the air compressor 14. The crankshaft 35 includes internal passages 40 to communicate lubricating oil from the engine to the compressor and to the bearing 34 and other drive components.

A bearing race 44 of a thrust bearing generally indicated by the numeral 46 is mounted on the spindle 36. The thrust bearing 46 further includes another bearing race 48 which engages the web 30 and cooperates with roller cage 49 in the bearing race 44 to retain circumferentially spaced rollers 50.

An annular piston 52 is slidably mounted in the bore 28 and includes axially extending portion 54 which extends coaxially with the output drive spindle 36 and the aperture 32. A circumferentially extending annular retaining member 56 is received in the bore 28 coaxial with piston 52 and output drive spindle 36. A seal 58 provides a sealing connection between the retainer 56 and the wall of the bore 28, and another seal 60 provides a sliding and sealing connection between the retainer 56 and the axially extending portion 54 of the piston 52. The retainer 56 includes a depressed portion 62 which acts as a spring retainer for circumferentially spaced springs 64. The springs 64 bear against bearing race 66 of a thrust bearing generally indicated by the numeral 68. The thrust bearing 68 further includes a circumferentially extending bearing race 70 rotatably engaged with the clutch plate 84 adjacent the bearing 68 which the rollers 72 engage. A roller cage 73 and rollers 72 are retained to the bearing race 66 by a retainer 74 which is carried on the outer diameter of the bearing race 66 and includes a lip 76 which wraps around the outer diameter of the roller cage 73 to thereby assure movement of the roller cage 73 with the bearing race 66 during axial movement of the thrust bearing 68, as will hereafter be described.

Clutch drive mechanism 10 further includes an input drive mechanism or gear generally indicated by the numeral 78 which is provided with internal teeth 80 which mesh with corresponding teeth on the accessory drive of the vehicle engine 12. The gear 78 is connected to the output drive spindle 36 through a disc clutch pack generally indicated by the numeral 82. The disc pack 82 includes clutch plates 84 which are mounted for axial sliding movement along the output drive spindle 36 on splines 85 formed thereon. Disc pack 82 further includes clutch plates 86 which are carried on splines 88 on the input drive mechanism or gear 78. A disc endplate 90 is mounted on the splines 85 and retained in place by a retaining ring 92 and shimmed as at 94 to assure proper engagement of the disc pack 82.

Figure 3:
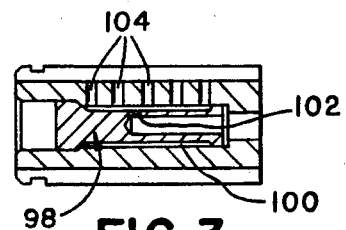
FIG. 3 is a fragmentary view of the circumscribed portion of FIG. 2, but illustrating a different embodiment of our invention.
Figure 2:
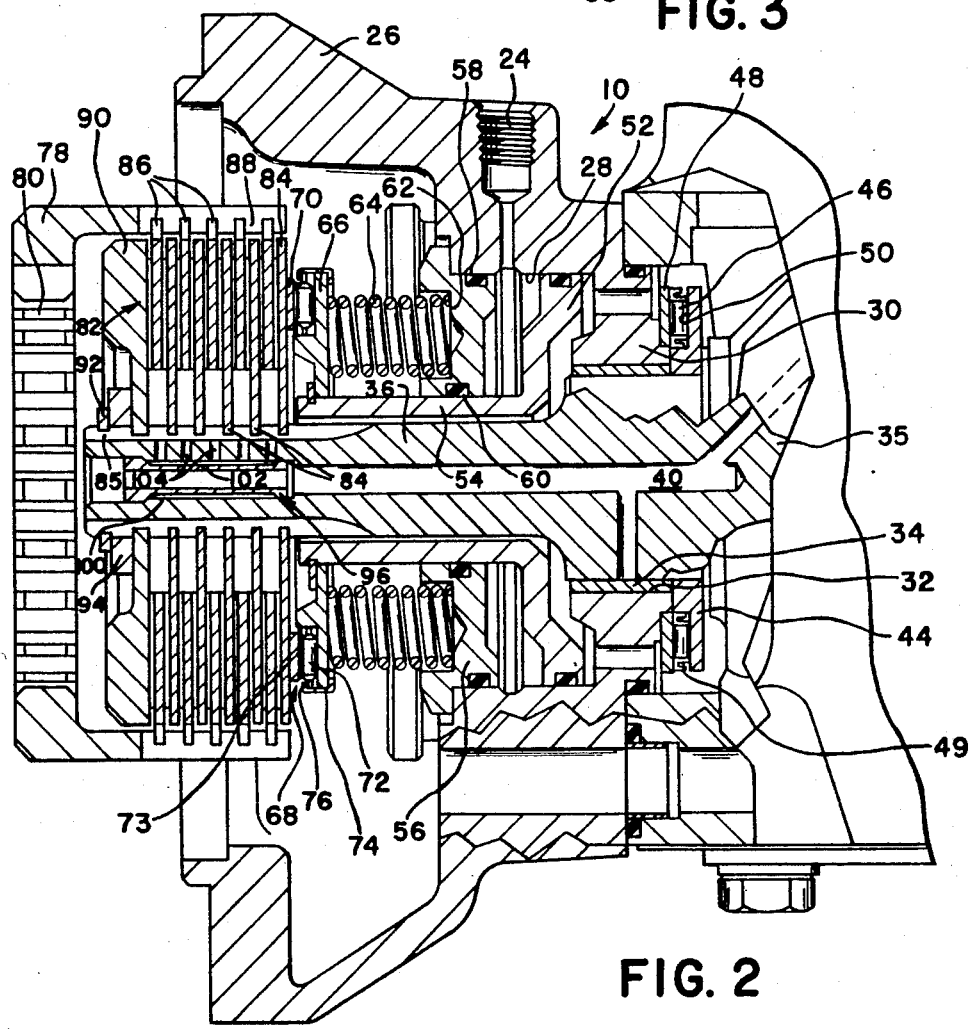
FIG. 2 is a transverse cross-sectional view of the drive mechanism made pursuant to the teachings of our present invention.

The portion of the lubricating passage 40 in the output drive spindle 36 of the crankshaft 35 receives a sleeve 96 in the end thereof upon which the clutch plates 84 are slidably mounted. The portion of the outer circumferential surface of the sleeve 96 between the end portions thereof is of a diameter smaller than the diameter of the passage 40 in which it is received to define an annulus 100 therebetween, and the end portions of the sleeve are substantially the same diameter as the passage 40 to provide a substantially fluid-tight connection therebetween. A flow-restricting orifice 102 permits limited communication from the lubricating passage 40 into the annulus 100. A series of apertures or openings 104 extend radially through the wall of the stub portion 36 to communicate the annulus 100 with the clutch plates 84, 86. It will be noted from FIG. 2 that there is a passage 104 for each set of clutch plates 84, 86, and the corresponding passage 104 is in substantial axial alignment with its corresponding clutch plates 84, 86. Accordingly, lubricating fluid can be communicated directly from the lubricating passage 40 through the orifice 102 and the annulus 100 to each of the passages 104, which communicate lubricating fluid directly to a corresponding set of clutch plates 84, 86. The embodiment of FIG. 2 of the invention is used in a clutch drive used with a compressor in which lubricating oil is fed directly from the engine to the left end (viewing FIG. 2) of the crankshaft and into the lubricating passage 40. Fluid is then communicated to the compressor through the passage 40. In some compressor installations, lubricating oil is fed from the engine through conduits or hoses (not shown) and then backfed toward the engine through the lubricating passage 40. The embodiment of FIG. 3 discloses a sleeve 98 used in such a backfed compressor in which the left hand end of the sleeve is solid to close the lubrication passage 40. In all other aspects, the operation and function of the lubricating sleeve 96 is identical to that of FIG. 2.

In operation, fluid communicated through the lubricating passage 40 is communicated through orifice 102 into the annulus 100. Because the size of the orifice 102 is restricted, fluid cannot flow into the annulus 100 in sufficient quantities such that the various internal components of the associated air compressor are starved for lubrication. Accordingly, passages 104 may be of sufficient size that they may be drilled economically, and a sufficient number of lubricating passages 104 can be provided to service each of the clutch plates 84, 86 without providing so large a flow area that lubricating fluid could be communicated through the clutch plates while starving the internal components of the air compressor for lubrication.

The conventional unloader mechanism 20, which is well known to those skilled in the art, maintains a pressure signal in the air line 22 whenever the pressure load in the reservoir 18 exceeds a predetermined level. The pressure signal in the air line 22 is communicated through the inlet port 24 into the bore 28, where it acts upon the piston 52, urging the latter to the right viewing FIG. 2 or from the position illustrated. Movement of the piston 52 to the right viewing FIG. 2 also carries the thrust bearing 68 in the same direction, away from the clutch disc pack 82 and compressing the springs 64. When the force or load on the disc pack 82 is relieved, the clutch plates 86 can rotate relative to the clutch plates 84, so that the driving connection between the input drive mechanism or gear 78 and the output drive spindle 36 is broken. When the pressure level in the reservoir 18 drops below the predetermined level, the unloading mechanism vents the pressure line 22, thereby exhausting the fluid pressure level in the bore 28. When the pressure in bore 28 acting against piston 52 is exhausted, the springs 64 yieldably urge the thrust bearing 68 to the left viewing FIG. 2, thereby drivingly engaging the clutch plates 84 with the clutch plates 86. Accordingly, the springs 64 maintain the load on the clutch disc pack 82 against the clutch end plate 90, thereby permitting the input drive mechanism or gear 78 to drive the compressor 14 through the output drive spindle 36.

We claim:

1. Drive mechanism for establishing and releasing a engine, clutch plates mounted on said output drive spindles and on said input drive means, and actuating means for driving said clutch plates into driving engagement with one another, said clutch plates and said air compressor both being lubricated by lubricating oil communicated through passage means extending through said crankshaft, the improvement comprising means for communicating lubricating oil from said passage means to said clutch plates, said communicating means including means for limiting the rate of flow of lubricating oil to said clutch plates to thereby assure that sufficient lubricating oil communicates through said passage means to lubricate said air compressor.

2. Drive means as claimed in claim 1, wherein said communicating means includes aperture means extending through the wall of said crankshaft and a flow-restricting orifice for limiting the rate of fluid flow through said aperture means.

3. Drive mechanism for establishing and releasing a driving connection between a vehicle air compressor and a vehicle engine, said air compressor having a crankshaft having an output drive spindle projecting from the compressor for mounting said drive mechanism, said drive mechanism including input drive means for providing a driving connection with the vehicle engine, clutch plates mounted on said output drive spindle and on said input drive means, and actuating means for driving said clutch plates into driving engagement with one another, said clutch plates and said air compressor being lubricated by lubricating oil communicated through passage means extending through said crankshaft, the improvement comprising means for communicating lubricating oil from said passage means to said clutch plates, said communicating means including means for limiting the rate of flow of lubricating oil to said clutch plates, said communicating means including aperture means extending through the wall of said crankshaft and a flow-restricting orifice for limiting the rate of fluid flow through said aperture means, said communicating means including a sleeve mounted in said passage means, said sleeve having an outer circumferential surface cooperating with the wall of said passage means to define an annulus therebetween, said aperture means extending through said wall of said passage means to communicate said annulus with said clutch plates.

4. Drive means as claimed in claim 3, wherein said sleeve defines an inner circumferential surface communicating with said passage means, said flow-restricting orifice extending through said sleeve to communicate said annulus with a section of said passage means defined within said sleeve by the inner circumferential surface.

5. Drive means as claimed in claim 4, wherein said clutch plates include sets of clutch plates, each of said sets including a clutch plate mounted for rotation with said output drive spindle and a clutch plate mounted for rotation with said input drive means, said aperture means including axially-spaced openings in the wall of said stub portion, each of said openings being in substantial alignment with a corresponding set of clutch plates.

6. Drive mechanism as claimed in claim 5, wherein means for providing a driving connection between the input drive means and the output drive means when the clutch means is engaged and for breaking the driving connection when the clutch means is disengaged, means for operating said clutch means, said output drive means including a spindle defining a substantially axially-extending lubricating passage therethrough, aperture means extending through said spindle to communicate said lubricating passage with said clutch means, and means for limiting the rate of fluid flow through said aperture means to a rate less than that permitted by the size of said aperature means, a sleeve being mounted in said lubricating passage, said sleeve having an outer circumferential surface cooperating with the wall defined by the lubricating passage to define an annulus therebetween, said aperture means communicating said annulus with said clutch means.

8. Drive means as claimed in claim 7, wherein said sleeve has an annular wall, said limiting means is a flow-restricting orifice extending through the wall of said sleeve to communicate said annulus with said lubricating passage.

9. Drive means as claimed in claim 8, wherein said clutch means include sets of clutch plates, each of said sets including a clutch plate mounted for rotation with said input drive means and a clutch plate mounted for rotation with said output drive means, said aperture means including axially-spaced openings in one of said drive means, each of said openings being in substantial alignment with a corresponding set of clutch plates.

10. Drive mechanism comprising a housing, output drive means rotatably supported by said housng for providing an output driving connection, input drive means for providing an input driving connection, clutch means for providing a driving connection between the input drive means and the output drive means when the clutch means is engaged and for breaking the driving connection when the clutch means is disengaged, means for operating said clutch means, said output drive means including a spindle defining a substantially axially-extending lubricating passage therethrough, aperture means extending through said spindle to communicate said lubricating passage with said clutch means, and means for limiting the rate of fluid flow through said aperture means to a rate less than that permitted by the size of said aperture means to thereby assure that at least a predetermined rate of communication of fluid thorugh said passage means that is not communicated through said aperature means.

* * * * *